United States Patent
Wang (10) Patent No.: US 10,473,208 B2
(45) Date of Patent: Nov. 12, 2019

(54) STRUCTURE OF COOLING AIR COLLECTION BOX FOR CONTINUOUSLY VARIABLE TRANSMISSION SYSTEM FOR ENGINE

(71) Applicant: KWANG YANG MOTOR CO., LTD., Kaohsiung (TW)

(72) Inventor: Chun-Kai Wang, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 16/003,125

(22) Filed: Jun. 8, 2018

(65) Prior Publication Data
US 2019/0285162 A1    Sep. 19, 2019

(30) Foreign Application Priority Data
Mar. 15, 2018 (TW) .............................. 107203356 U (51) Int. Cl.
*F16H 57/04* (2010.01)
*F16H 57/027* (2012.01)
*F16H 57/02* (2012.01)

(52) U.S. Cl.
CPC ....... *F16H 57/0416* (2013.01); *F16H 57/027* (2013.01); *F16H 2057/0203* (2013.01)

(58) Field of Classification Search
CPC .. F16H 57/025; F16H 57/027; F16H 57/0415; F16H 57/0416; F16H 57/0489; F16H 2057/0203; B60K 11/06; B60K 11/08
See application file for complete search history.

(56) References Cited

U.S. PATENT DOCUMENTS

| | | | | |
|---|---|---|---|---|
| 6,820,708 B2* | 11/2004 | Nakamura | ........... | F16H 57/0489 180/296 |
| 6,938,676 B2* | 9/2005 | Lan | .......... | B62K 5/01 165/41 |
| 7,275,512 B2* | 10/2007 | Deiss | ...................... | F02B 27/02 123/184.55 |
| 7,546,892 B2* | 6/2009 | Lan | .......... | B62K 5/01 180/68.1 |
| 7,975,792 B2* | 7/2011 | Nobuhira | ................. | B62J 17/02 180/68.2 |

(Continued)

*Primary Examiner* — Adam D Rogers
(74) *Attorney, Agent, or Firm* — Leong C. Lei (57) ABSTRACT

An engine includes a cylinder portion under which a crankshaft portion is arranged. A transmission box is arranged at one side of the crankshaft portion and includes a continuously variable transmission system arranged therein. The transmission box includes a cooling air inlet opening and a cooling air outlet opening. A cooling air intake tube is arranged on the cooling air inlet opening. The cooling air intake tube includes a cooling air ingress port. An air collection box is arranged on the cooling air ingress port. The cooling air intake tube includes a curved section posterior to the cooling air ingress port and the curved section includes a riser section. This helps ensure cleanliness of the external fresh cold air entering the air collection box and guided into the cooling air intake tube to prevent external water and dust from entering the transmission box to cause damage to the continuously variable transmission system.

12 Claims, 5 Drawing Sheets

(56) References Cited

U.S. PATENT DOCUMENTS

| | | | |
|---|---|---|---|
| 7,981,179 B2* | 7/2011 | Nobuhira | B01D 46/0005 |
| | | | 123/198 E |
| 8,746,719 B2* | 6/2014 | Safranski | B60G 3/14 |
| | | | 280/124.148 |
| 9,279,427 B2* | 3/2016 | Tseng | F04D 29/582 |
| 9,341,255 B2* | 5/2016 | Itoo | F16H 57/0489 |
| 9,738,134 B1* | 8/2017 | Rittenour | B60H 1/0045 |
| 9,863,523 B2* | 1/2018 | Stocks | F16H 57/0416 |
| 2008/0156374 A1* | 7/2008 | Nakano | F16H 57/027 |
| | | | 137/14 |
| 2016/0061314 A1* | 3/2016 | Kuhl | F16H 57/0489 |
| | | | 474/8 |

* cited by examiner

STRUCTURE OF COOLING AIR COLLECTION BOX FOR CONTINUOUSLY VARIABLE TRANSMISSION SYSTEM FOR ENGINE

(a) TECHNICAL FIELD OF THE INVENTION

The present invention relates generally to a structure of a cooling air collection box for a continuously variable transmission system for an engine, and more particularly to a structure of a cooling air collection box for a continuously variable transmission system for an engine that ensures external fresh cold air that is drawn into an air collection box and conducted into a cooling air intake tube is clean in order to prevent external water and dust from entering a transmission box to cause damage to a continuously variable transmission system.

(b) DESCRIPTION OF THE PRIOR ART

Figure 1:
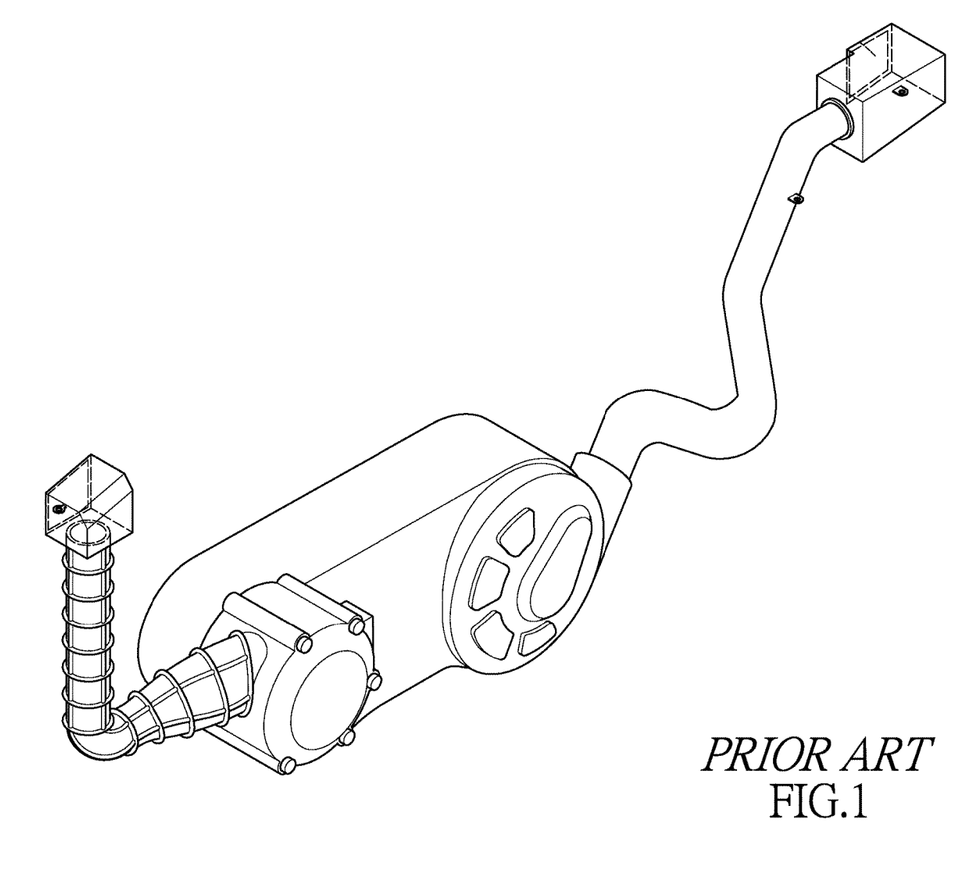
FIGS. 1 and 2 illustrate a continuously variable transmission system cooling structure for all terrain vehicles according to TWM249854.
Figure 2:
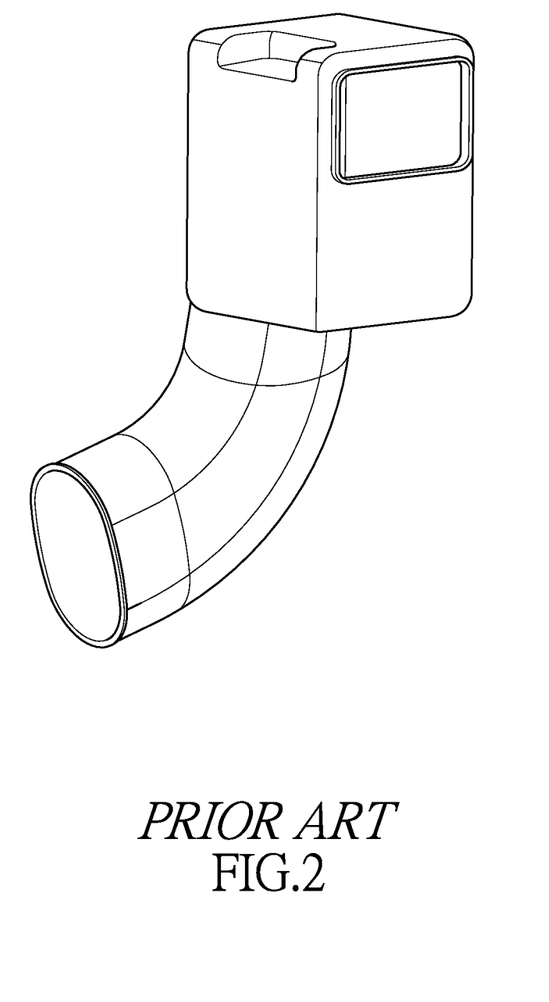

As shown in FIGS. 1 and 2, to handle high heat generated by the operation of a continuously variable transmission mechanism of a vehicle in order to improve the performance and service life of the continuously variable transmission mechanism, patent document TWM249854, owned by the applicant, proposes a continuously variable transmission system cooling structure for all terrain vehicles. The continuously variable transmission system cooling structure for all terrain vehicles disclosed in the patent document TWM249854 is effective in providing an effective cooling effect for continuously variable transmission mechanisms of vehicles.

However, further improvements have been made for the cooling effect of the continuously variable transmission mechanism.

SUMMARY OF THE INVENTION

The primary objective of the present invention is to provide a structure of a cooling air collection box for a continuously variable transmission system for an engine that ensures external fresh cold air that is drawn into an air collection box and conducted into a cooling air intake tube is clean in order to prevent external water and dust from entering a transmission box to cause damage to a continuously variable transmission system.

Thus, the primary technical solution of claim 1 is to provide a structure of a cooling air collection box for a continuously variable transmission system for an engine, wherein the engine comprises a cylinder portion; a crankshaft portion is provided under the cylinder portion; a transmission box is arranged at one side of the transmission box; the transmission box comprises a continuously variable transmission system arranged therein; the transmission box comprises a cooling air inlet opening and a cooling air outlet opening; a cooling air intake tube is arranged on the cooling air inlet opening; the cooling air intake tube comprises a cooling air ingress port; an air collection box is provided on the cooling air ingress port; the cooling air intake tube comprises a curved section that is arranged posterior to the cooling air ingress port and the curved section comprises a riser section.

The efficacy that is achieved with the primary technical solution of claim 1 is to ensure cleanliness of the external fresh cold air that is drawn into the air collection box and is guided into the cooling air intake tube in order to prevent external water and dust from entering the transmission box to cause damages to the continuously variable transmission system.

DETAILED DESCRIPTION OF THE PREFERRED EMBODIMENTS

For easy understanding of the structure of the present invention and the effectiveness achieved with the present invention, a detailed description will be provided below with reference to the drawings.

Figure 3:
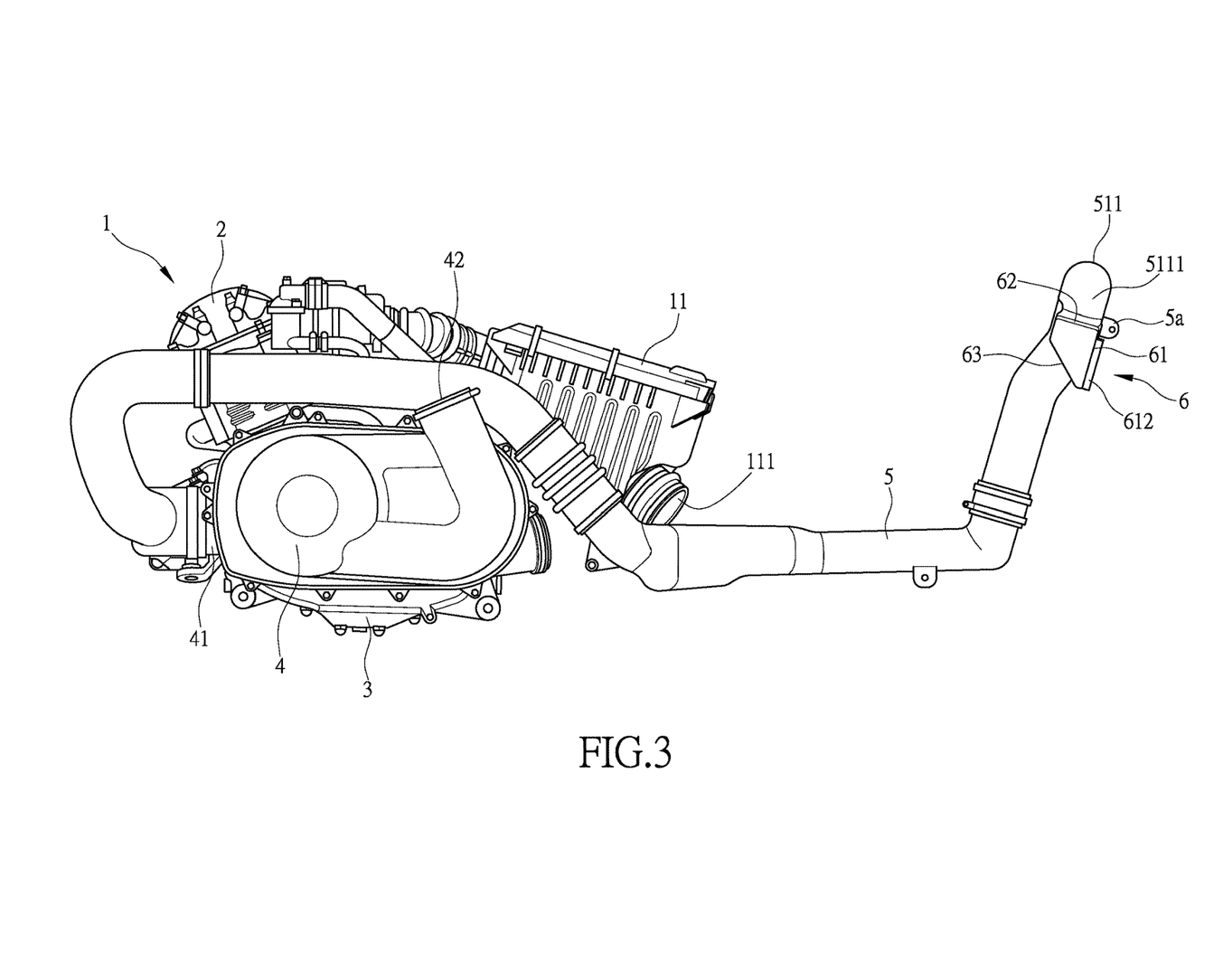
FIG. 3 is a schematic view showing an arrangement of cooling air collection box for a continuously variable transmission system for an engine according to the present invention.

Referring first to FIG. 3, a structure of a cooling air collection box for a continuously variable transmission system for an engine according to the present invention is shown. An engine 1 has a cylinder portion 2 under which a crankshaft case 3 is arranged. Provided on one side of the crankshaft case 3 is a transmission box 4. The transmission box 4 comprises a continuously variable transmission system (not shown) provided therein. The transmission box 4 is provided with a cooling air inlet opening 41 in a direction toward a front side of a vehicle body. The transmission box 4 is provided with a cooling air outlet opening 42 in a direction toward a back side of the vehicle body. The cooling air inlet opening 41 of the transmission box 4 is connected to a cooling air intake tube 5. The cooling air intake tube 5 is provided, at an end thereof that is distant from the cooling air inlet opening 41, with an air collection box 6. As such, external fresh cold air may move through the air collection box 6 to enter the cooling air intake tube 5, and is then conducted by the cooling air intake tube 5 through the cooling air inlet opening 41 to get into the transmission box 4 to carry out cooling of the continuously variable transmission system arranged in the transmission box 4. Hot air, which is formed after the cooling operation, is discharged through the cooling air outlet opening 42 of the transmission box 4, whereby a cooling effect may be applied to the continuously variable transmission system of the transmission box 4 so as to improve the performance and service life of the continuously variable transmission system inside the transmission box 4. The cooling air intake tube 5 may be further connected with an air inlet tube of an engine air filter 11.

Figure 4:
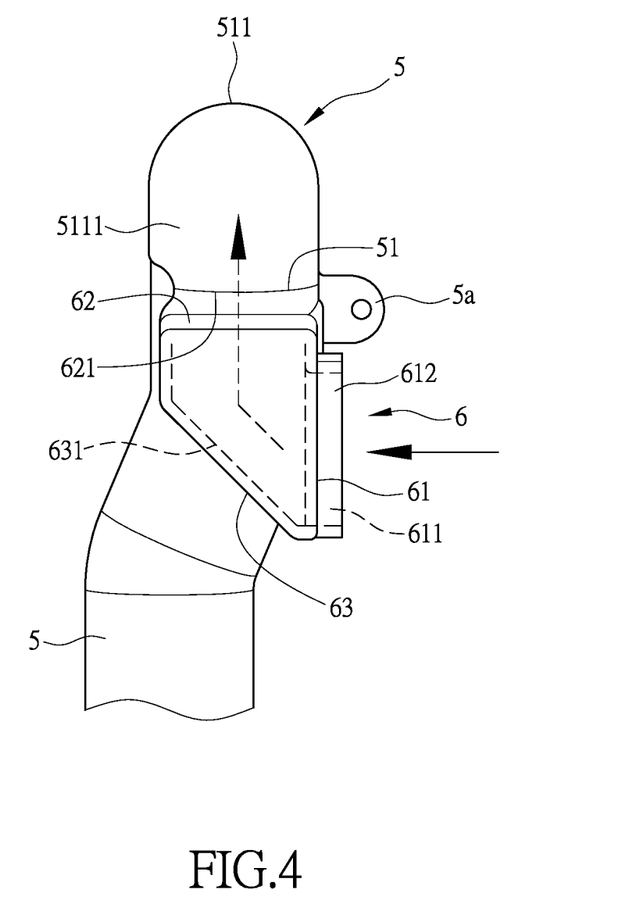
FIG. 4 is a schematic view showing a cooling air intake tube and an air collection box according to the present invention.
Figure 5:
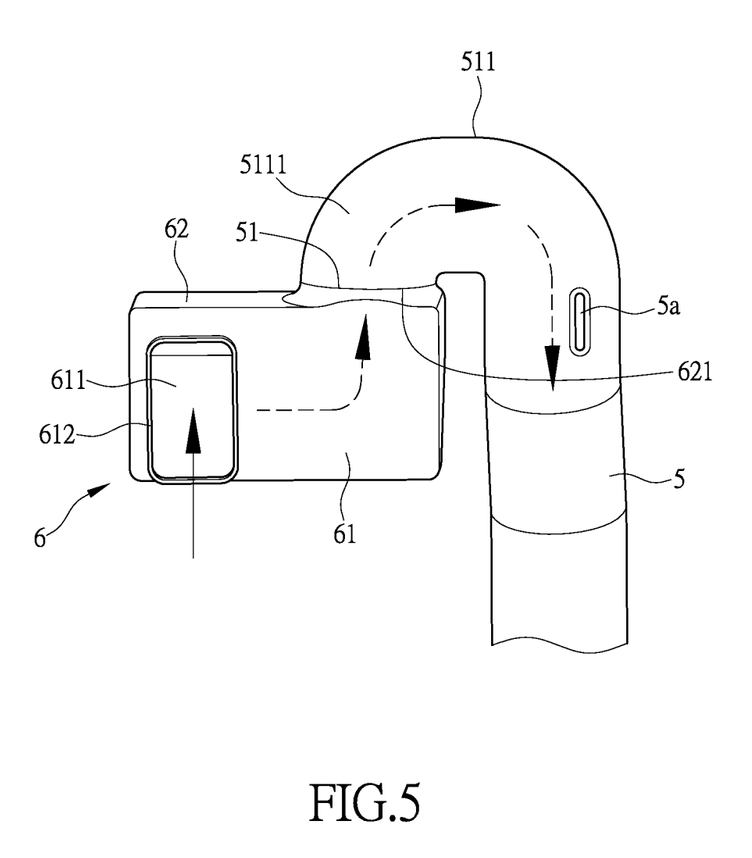
FIG. 5 is a schematic view showing the cooling air intake tube and the air collection box according to the present invention taken from a different perspective.

As shown in FIGS. 3, 4, and 5, the cooling air intake tube 5 is provided, at an end thereof that is distant from the cooling air inlet opening 41, with an inverted U-shaped curved section 511 that is located posterior to a cooling air ingress port 51. When external water and dust entrain cold air to move through the air collection box 6 to enter the cooling air intake tube 5, since the curved section 511 comprises a riser section 5111, due to the own weight, the external water and dust are acted upon by the gravitational force in the riser section 5111 of the curved section 511 to fall down into the air collection box 6. The air collection box 6 is arranged on the cooling air ingress port 51 at an end of the cooling air intake tube 5 that is distant from the cooling air inlet opening 41; and the air collection box 6 is formed as a box having at least three sides closed. One side of the air collection box 6 functions as an air entrance surface 61, and the air entrance surface 61 is formed with an air entrance opening 611. The air entrance opening 611 is in communication with the air collection box 6. The air entrance opening 611 takes an area that is around one third to a half of that of the air entrance surface 61. In other words, the air entrance surface 61 has a portion that maintains closed and shielded. The air entrance opening 611 is provided, on an outer circumference, with a raised rib 612. The raised rib 612 is provided to increase the stiffness and strength of the air entrance surface 61 and the air entrance opening 611 and also to provide localized blocking for the air entrance opening 611.

As shown in FIGS. 3, 4, and 5, the air collection box 6 comprises an air exit surface 62 that is located at one side above a top of the air entrance surface 61. The air exit surface 62 is formed with an air exit opening 621. The air exit opening 621 takes an area that is only a part of that of the air exit surface 62. The air exit opening 621 is in communication with the air collection box 6, and the air exit opening 621 is in communication with the cooling air ingress port 51 of the cooling air intake tube 5, wherein the air exit opening 621 and the air entrance opening 611 are arranged to stagger or be offset with respect to each other. Taking the illustration of FIG. 5 as an example, the air entrance opening 611 is arranged at a left side portion (left side of the drawing) of the front side of the air collection box 6, while the air exit opening 621 is arranged at a right side portion of the top of the air collection box 6, such that the air exit opening 621 and the air entrance opening 611 stagger or is offset with respect to each other. The external fresh cold air, when moving through the air entrance opening 611 of the air collection box 6 to get into the air collection box 6, is forced to move in a tortuous way through the air exit opening 621 to get into the cooling air intake tube 5, and then enter the transmission box 4 to carry out cooling of the continuously variable transmission system.

As shown in FIGS. 3 and 4, the air collection box 6 comprises a guide surface 63 that is located opposite to the air entrance surface 61. The guide surface 63 comprises a guiding section 631. The guiding section 631 is arranged in an inclined condition. More specifically, the guiding section 631 is inclined in a direction from top to bottom. Taking the illustration of FIG. 4 as an example, the guide surface 63 inclines in a direction from the left upper side to the right lower side of the drawing sheet. The guide surface 63 has a lower end that is connected to a bottom of the air entrance surface 61. As such, the external fresh cold air, when moving through the air entrance opening 611 of the air collection box 6 to get into the air collection box 6, is guided by the guiding section 631 of the guide surface 63 to move in a curved way through the air exit opening 621 to get into the cooling air intake tube 5, and then enter the transmission box 4 to carry out cooling of the continuously variable transmission system. External water and dust, when entraining the cold air to enter the air collection box 6, is guided by the guiding section 631 of the guide surface 63 to move in a curved way toward the air exit opening 621 such that the water and dust are driven by their own weights to fall down onto and thus guided by the guiding section 631 toward the lower end of the guide surface 63 to be subsequently discharged out of the air collection box 6 through the air entrance opening 611. In addition, water and dust that falls from the curved section 511 of the cooling air intake tube 5 is also guided by the guiding section 631 toward the lower end of the guide surface 63 to be discharged through the air entrance opening 611 to the outside of the air collection box 6. In this way, the external fresh cold air that moves through the air collection box 6 to get into the cooling air intake tube 5 can maintain proper cleanliness to prevent external water and dust from entering the transmission box 4 to cause damage to the continuously variable transmission system.

As shown in FIGS. 3 and 4, the cooling air intake tube 5 is also provided with a mounting section 5a. The mounting section 5a allows the air collection box 6 that is connected to the cooling air intake tube 5 to be mounted to any desired location on the vehicle body, so as to ease installation and arrangement of the air collection box 6.

As shown in FIGS. 3, 4, and 5, to practice the present invention, when the engine 1 is set in operation to drive the continuously variable transmission system inside the transmission box 4 to rotate, the continuously variable transmission system generates a suction force so that the suction force induces sucking force at the air entrance opening 611 of the air collection box 6 that draws in the external fresh cold air and the external fresh cold air moves through the air entrance opening 611 of the air collection box 6 to get into the air collection box 6 and is guided by the guiding section 631 of the guide surface 63 to move in a curved way toward the air exit opening 621 to further move through the cooling air ingress port 51 into the cooling air intake tube 5, and then moves through the cooling air inlet opening 41 into the transmission box 4 to carry out cooling of the continuously variable transmission system. Hot air that is generated after the cooling operation is discharged through the cooling air outlet opening 42 of the transmission box 4 to the outside of the transmission box 4. At the same time, the external water and dust, when entraining the cold air to get into the air collection box 6 and guided by the guiding section 631 of the guide surface 63 to move in a curved way toward the air exit opening 621 are caused by the weights of the water and dust to fall down onto and thus be guided by the guiding section 631 toward the lower end of the guide surface 63 to be subsequently discharged out of the air collection box 6 through the air entrance opening 611. In addition, water and dust that fall from the curved section 511 of the cooling air intake tube 5 is also guided by the guiding section 631 toward the lower end of the guide surface 63 to be discharged through the air entrance opening 611 to the outside of the air collection box 6. In this way, the external fresh cold air that enters through the air collection box 6 to get into the cooling air intake tube 5 can maintain proper cleanliness to prevent external water and dust from entering the transmission box 4 to cause damage to the continuously variable transmission system.

The primary efficacy of the present invention is that the cooling air intake tube 5 is provided, posterior to the cooling air ingress port 51, with the curved section 511, and the curved section 511 comprises a riser section 5111, so that the external fresh cold air that moves through the air collection box 6 to get into the cooling air intake tube 5 can maintain cleanliness to prevent the external water and dust from entering the transmission box 4 to cause damage to the continuously variable transmission system.

The second efficacy of the present invention is that the air collection box 6 comprises an air entrance surface 61, and the air entrance surface 61 is formed with an air entrance opening 611 in communication with the air collection box 6 so as to facilitate entry of the external fresh cold air into the air collection box 6.

The third efficacy of the present invention is that the air entrance opening 611 occupies an area that take around one third to a half of the surface area of the air entrance surface 61 so as to facilitate entry of the external fresh cold air into the air collection box 6 and makes the external air that enters the air collection box 6 moving around the interior of the air collection box 6.

The fourth efficacy of the present invention is that the air entrance opening 611 is provided on an outer circumference with a raised rib 612 to increase the stiffness and strength of the air collection box 6 and blocking a portion of the external water and dust from entering the air collection box 6.

The fifth efficacy of the present invention is that the raised rib 612 is arranged around an outer circumference of the air entrance opening 611 to increase the stiffness and strength of the air entrance surface 61 and the air entrance opening 611 of the air collection box 6 and blocking a portion of the external water and dust from entering the air collection box 6.

The sixth efficacy of the present invention is that the air collection box 6 comprises an air exit surface 62, and the air exit surface 62 is formed with an air exit opening 621 in communication with the air collection box so that the external fresh cold air, after entering the air collection box 6, is smoothly guided into the cooling air intake tube 5.

The seventh efficacy of the present invention is that the air collection box 6 comprises an air entrance surface 61 and an air exit surface 62, wherein the air entrance surface 61 is formed with the air exit opening 621 in communication with the air collection box 6 and the air exit surface 62 is formed with an air exit opening 621 in communication with the air collection box 6, wherein the air exit opening 621 and the air entrance opening 611 are arranged to stagger or be offset with respect to each other so as to ensure the external air that enters the air collection box 6 is forced to move around in the air collection box 6 so that water and dust that entrains the external air to get into the air collection box 6 are allowed to freely fall down into the air collection box 6.

The eighth efficacy of the present invention is that the air collection box 6 further comprises a guide surface 63, and the guide surface 63 comprises a guiding section 631 so that the external air that enters the air collection box 6 is forced to move around inside the air collection box 6 to allow the water and dust that entrain the external air to enter the air collection box 6 to freely fall in the air collection box 6 to be discharged through the air entrance opening 611 to the outside of the air collection box 6.

The ninth efficacy of the present invention is that the guiding section 631 is set in an inclined condition such that the external air that enters the air collection box 6 is forced to move around inside the air collection box 6 to allow the water and dust that entrain the external air to enter the air collection box 6 to freely fall in the air collection box 6 to be discharged through the air entrance opening 611 to the outside of the air collection box 6.

The tenth efficacy of the present invention is that the cooling air intake tube 5 is further provided with a mounting section 5a, such that the mounting section 5a allows the air collection box 6 that is connected to the cooling air intake tube 5 to be mounted to any desired location on the vehicle body to thereby facilitate installation and arrangement of the air collection box 6.

In summary, the present invention provides a structure of a cooling air collection box for a continuously variable transmission system for an engine. With the structural arrangement described above, water and dust are effectively prevented from entering the transmission box 4 to avoid damage caused on the continuously variable transmission system of the transmission box 4 and also to achieve an efficacy of reducing the number of components used and making maintenance easy. Compared to the prior art, a great improvement is made in respect of the effectiveness.

I claim:

1. A structure of a cooling air collection box for a continuously variable transmission system for an engine, wherein the engine comprises a cylinder portion, a crankshaft portion being provided under the cylinder portion, a transmission box being arranged at one side of the crankshaft portion, the transmission box comprising a continuously variable transmission system arranged therein, wherein the structure of the cooling air collection box comprises a cooling air inlet opening and a cooling air outlet opening that is provided with the transmission box, a cooling air intake tube arranged on the cooling air inlet opening, the cooling air intake tube comprising a cooling air ingress port, an air collection box being provided on the cooling air ingress port, characterized in that the cooling air intake tube comprises a curved section arranged posterior to the cooling air ingress port and the curved section comprises a riser section; wherein the air collection box comprises an air entrance surface, the air entrance surface being formed with an air entrance opening in communication with the air collection box, and the air entrance opening has an area that is one third to a half of a surface area of the air entrance surface.

2. The structure of the cooling air collection box for a continuously variable transmission system for an engine according to claim 1, wherein the air entrance opening has an outer circumference that is provided with a raised rib.

3. The structure of the cooling air collection box for a continuously variable transmission system for an engine according to claim 2, wherein the raised rib is circumferentially arranged on the outer circumference of the air entrance opening.

4. The structure of the cooling air collection box for a continuously variable transmission system for an engine according to claim 1, wherein the air collection box comprises an air exit surface, the air exit surface being forming with an air exit opening in communication with the air collection box.

5. The structure of the cooling air collection box for a continuously variable transmission system for an engine according to claim 4, wherein the air collection box further comprises a guide surface, the guide surface comprising a guiding section.

6. The structure of the cooling air collection box for a continuously variable transmission system for an engine according to claim 5, wherein the guiding section is set in an inclined condition.

7. The structure of the cooling air collection box for a continuously variable transmission system for an engine according to claim 1, wherein the air collection box comprises the air entrance surface and an air exit surface, the air entrance surface being formed with the air entrance opening in communication with the air collection box, the air exit surface being formed with an air exit opening in communication with the air collection box, the air exit opening and the air entrance opening being arranged in a manner of being offset with respect to each other.

8. The structure of the cooling air collection box for a continuously variable transmission system for an engine according to claim 7, wherein the air collection box further comprises a guide surface, the guide surface comprising a guiding section.

9. The structure of the cooling air collection box for a continuously variable transmission system for an engine according to claim 8, wherein the guiding section is set in an inclined condition.

10. The structure of the cooling air collection box for a continuously variable transmission system for an engine according to claim 1, wherein the air collection box further comprises a guide surface, the guide surface comprising a guiding section.

11. The structure of the cooling air collection box for a continuously variable transmission system for an engine according to claim 10, wherein the guiding section is set in an inclined condition.

12. The structure of the cooling air collection box for a continuously variable transmission system for an engine according to claim 1, wherein the cooling air intake tube is further provided with a mounting section.

\* \* \* \* \*